United States Patent
Shih

(10) Patent No.: US 8,045,278 B2
(45) Date of Patent: Oct. 25, 2011

(54) SHORT OVERALL LENGTH IMAGING LENS SYSTEM WITH FOUR LENSES

(75) Inventor: Bo-Yuan Shih, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/276,320

(22) Filed: Nov. 22, 2008

(65) Prior Publication Data

US 2011/0205640 A1    Aug. 25, 2011

(30) Foreign Application Priority Data

May 28, 2008    (TW) ................................. 97119785 A

(51) Int. Cl.
G02B 13/18    (2006.01)
G02B 3/02    (2006.01)
G02B 9/34    (2006.01)

(52) U.S. Cl. ........................ 359/715; 359/773
(58) Field of Classification Search .................. 359/715, 359/773, 784

See application file for complete search history.

(56) References Cited

U.S. PATENT DOCUMENTS

2008/0130140 A1*    6/2008    Shin ............................... 359/773
2009/0097135 A1*    4/2009    Yang ............................. 359/715

* cited by examiner

*Primary Examiner* — Alicia M Harrington
(74) *Attorney, Agent, or Firm* — Muncy, Geissler, Olds & Lowe, PLLC

(57) ABSTRACT

Along an optical axis from an object side to an image side, a short overall length imaging lens system with four lenses includes a first lens with positive power that is a meniscus spherical/aspherical lens with a convex surface on the object side; an aperture stop; a second lens with negative power that is a meniscus aspherical lens with a convex surface facing the object side; a third lens with positive power that is a meniscus aspherical lens and a concave surface on the object side; and a fourth lens with negative power that is a biconcave aspherical lens with at least one inflection point in the effective diameter range of the optical surface on the image side so as to make the positive power gradually change into negative power. Moreover, the imaging lens system satisfies the following conditions:

$$0.25 \le \frac{d2 + d4 + d6}{f_s} \le 0.40; 0.8 \le \frac{Y \cdot \tan(\omega)}{Bf} \le 2.7$$

Thereby the imaging lens system provides good aberration correction with reduced overall lens length. Moreover, due to simple shape of the optical surface of each lens, the lens is easy to be produced, the lens system is minimized and the cost is reduced.

13 Claims, 16 Drawing Sheets

SHORT OVERALL LENGTH IMAGING LENS SYSTEM WITH FOUR LENSES

BACKGROUND OF THE INVENTION

The present invention relates to a short overall length imaging lens system with four lenses, especially to an imaging lens system for mobile phones or mini-cameras with image sensors such as CCD (Charge Coupled Device) or CMOS (Complementary Metal Oxide Semiconductor). The imaging lens system is formed by four lenses and is with features of short overall length and low cost.

The electronics available now become more compact and multifunctional. Most of them such as digital still cameras, PC (personal computer) cameras, network cameras and mobile phones, even persona digital assistants (PDA) are equipped with an image lens system. The imaging lens system not only requires good imaging quality but also needs compact volume (short overall length) and lower cost. Moreover, the imaging lens system with larger field angle can improve image quality of the electronics and match user's requirements.

The imaging lens system applied to mini-size electronics includes various designs such as two lenses, three lenses, four lenses or five lenses. In consideration of imaging quality, multiple lenses system has better performance in aberration correction and MTF (modulation transfer function) so it is applied to electronics with requirement of high pixel count.

In recent years, the requirements for the imaging lens system applied to high level mini-cameras, camera phones or PDA (personal digital assistant) etc. include compact volume (short overall length), good aberration correction, high pixel count and low cost. In compact design of the imaging lens system with four lenses, prior arts disclosed such as US2007/0081259, U.S. Pat. No. 7,177,098, US2003/0161051, EP1868021, EP1387199, JP2005-164899, JP2007-322844, JP2007-065374, JP2003-270530, TW I254140, TWM313780, TWM 313245, CN1573407, CN1873461, CN1892279 etc., good aberration correction is achieved by the combinations of lenses with various positive power or negative power. Moreover, designs with positive refractive power of first lens, negative of second lens, positive of third lens and negative of fourth lens were disclosed as, US2007/014033, US2008/0024882, U.S. Pat. No. 7,215,492, U.S. Pat. No. 7,321,474, EP1821129, JP2007-225833, JP2008-020893, JP 2007-286153, JP 2007-193195, TWM314860, CN1815287, etc., to achieve good aberration correction. Especially on the fourth lens, the area near the optical axis on the object sides is a convex surface while the surface turns into a concave surface at the edge of the lens and change of the curvature is quite large. Or the area near the optical axis on the image sides is a concave surface while the surface turns into a convex surface at the edge of the lens. Such lens is quite difficult to be produced. Once the glass material is used, shape of the optical surface is difficult to control while being ground or molded. When the lens is produced by plastic injection molding, there are still some problems such as cooling shrinking or others. In order to overcome difficulties in manufacturing, the fourth lens with simple optical surface improves the yield rate, as shown in US2007/0058256, US2007/0070234, US 2007/0242370, US2008/0043346, JP2005-091666, JP2005-025174, JP 2004-233654, and P2007-219520 etc.

The users are in urgent need of the imaging lens system with short overall length, good aberration correction, high pixel count and low cost. However, the overall length of the imaging lens system of prior arts requires further minimization. In order to achieve lost cost, the lens is made from material with lower refractive index instead of the material with high refractive index and high cost. Once an image side of the fourth lens is a concave surface, flare or ghost image is reduced. The yield rate is also improved if the lens includes a simpler optical surface.

SUMMARY OF THE INVENTION

Therefore it is a primary object of the present invention to provide a short overall length imaging lens system with four lenses along an optical axis from an object side to an image side including: a first lens with positive power that is a meniscus lens with a convex surface on the object side and is a spherical lens or with at least one aspherical surface; an aperture stop; a second meniscus lens with negative power, a convex surface facing the object side and at least one aspherical optical surface; a third lens that is a meniscus lens with positive power, a concave surface on the object side, and at least one aspherical optical surface; and a fourth lens that is a biconcave aspherical lens with negative power and at least one inflection point in the effective diameter range of the optical surface on the image side while the optical surface on the object side is a concave surface without inflection point. Moreover, the imaging lens system satisfies the following conditions:

$$0.25 \leq \frac{d2 + d4 + d6}{f_s} \leq 0.40 \quad (1)$$

$$0.8 \leq \frac{Y \cdot \tan(\omega)}{Bf} \leq 2.7 \quad (2)$$

$$40\% \leq \frac{H_-}{H_t} \leq 70\% \quad (3)$$

$$1.0 \leq \frac{TL}{f_s} \leq 1.5 \quad (4)$$

$$1.0 \leq \frac{R31 + R32}{R31 - R32} \leq 4.0 \quad (5)$$

wherein d2 is distance from the image side of the first lens to the object side of the second lens on the optical axis, d4 is distance from the image side of the second lens to the object side of the third lens on the optical axis, d6 is distance from the image side of the third lens to the object side of the fourth lens on the optical axis, Bf is back focal length of the imaging lens system, TL is distance from the object side of the first lens to an image plane on the optical axis, ω is half of maximum field angle, $f_s$ is effective focal length of the imaging lens system, Y is half of maximum diagonal of imaging height, $H_-$ is the perpendicular distance from the inflection point on the image side of the fourth lens to the optical axis, $H_t$ is the perpendicular distance from the maximum optical effective point on the image side of the fourth lens to the optical axis, R31 is radius of curvature of the object side of the fourth lens, and R32 is radius of curvature of the image side of the third lens.

Furthermore, the first lens can be a spherical lens and the fourth lens can be a spherical lens so as to reduce the cost.

In addition, the first lens, the second lens, the third lens, and the fourth lens are made from glass or plastic whose refractive index is lower than 1.63. Without using material with high refractive index, the cost is down. Thereby, the imaging lens system according to the present invention has features of short overall length, good aberration correction and low cost so as to have broader applications.

DETAILED DESCRIPTION OF THE PREFERRED EMBODIMENT

Figure 1:
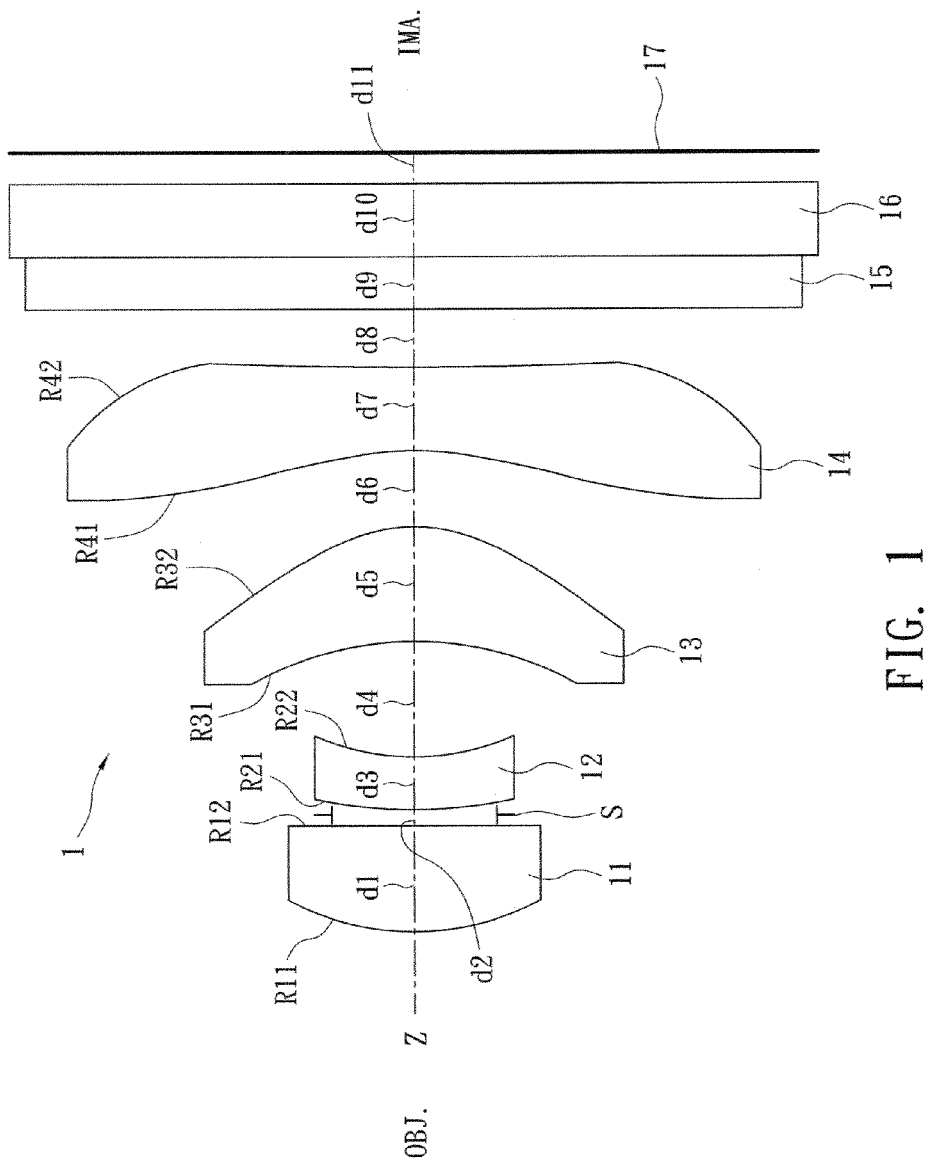
FIG. 1 is a schematic drawing showing optical structure of an embodiment according to the present invention.

Refer to FIG. 1, along an optical axis Z from the object side to the image side, an imaging lens system 1 according to the present invention consists of a first lens 11, an aperture stop S, a second lens 12, a third lens 13, a fourth lens 14, an IR (infrared) cut-off filter 15, a surface glass 16 and an image sensor 17. While taking images, light from the object passes the first lens 11, the second lens 12, the third lens 13, the fourth lens 14, the IR cut-off filter 15 and the surface glass 16 to form an image on image plane of the image sensor 17.

The first lens 11 is a meniscus lens with positive power and an object side R11 thereof is a convex surface while an image side R12 is a concave surface. The first lens 11 is made from glass or plastic whose refractive index ($N_d$) is lower than 1.63. Moreover, the object side R11/the image side R12 can be a spherical surface or an aspherical surface.

The second lens 12 is a meniscus lens with negative power and an object side R21 thereof is a convex surface while an image side R22 is a concave surface. The second lens 12 is made from glass or plastic whose refractive index ($N_d$) is lower than 1.63. Moreover, the object side R21 and the image side R12 are aspherical surfaces.

The third lens 13 is a meniscus lens with positive power and an object side R31 thereof is a concave surface while an image side R32 is a convex surface. The third lens 12 is made from glass or plastic whose refractive index ($N_d$) is lower than 1.63. Moreover, the object side R31 and the image side R32 are aspherical surfaces. In order to achieve good optical effects, the object side R31 and the image side R32 satisfy the equation (5).

Figure 2:
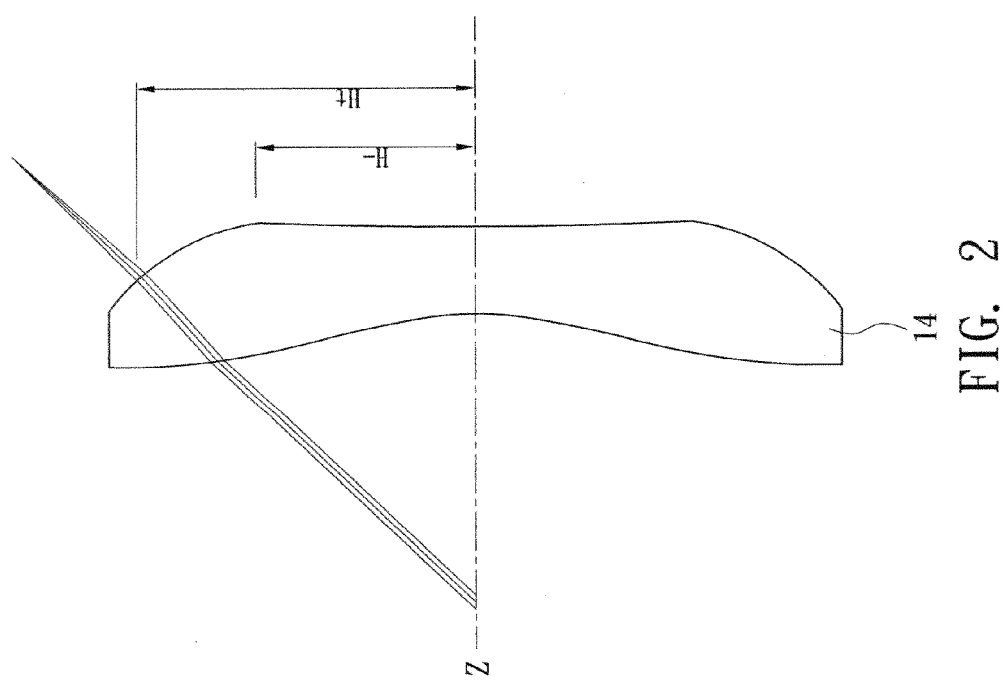
FIG. 2 is a side view of a fourth lens of an embodiment according to the present invention.

The fourth lens 14 is a biconcave lens with negative power and is made from glass or plastic whose refractive index ($N_d$) is lower than 1.63. An object side surface thereof R41 can be spherical surface or aspherical surface without the inflection point. That means on the object side surface R41, there is no inflection point in the effective diameter range from the lens center to the edge. A image side surface R42 of the fourth lens 14 is an aspherical lens having at least one inflection point in the effective diameter range from the lens center to the edge. The cross sectional view of the fourth lens 14 is shown as FIG. 2, the middle part is lower while the two sides are projective so that an inflection point is formed on a curve at which the curvature changes sign. When a tangent line passes the inflection point and intersects with the optical axis, the distance from the inflection point to the optical axis is lens height within negative power range, labeled as $H_-$. That's the perpendicular distance from the inflection point to its intersection point of the optical axis. The perpendicular distance from the maximum optical effective point of the image side R42 to the optical axis is labeled as $H_t$. The ratio of $H_-$ to $H_t$ represents the range of change of the refractive power. In order to have better image, the preferred ratio should be larger than 40%. Yet for easy manufacturing, the curvature change should be lowered so that the preferred ratio is smaller than 70%. The equation (3) is satisfied.

The aperture stop S is a middle-positioned aperture disposed between the first lens 11 and the second lens 12. The IR cut-off filter 15 is a lens or a film formed by coating technique for blocking infrared light and is attached on the surface glass 16. The surface glass 16 is a transparent glass for protecting lens surfaces and maintaining constant distance among the lenses. The image sensor 17 is Charge Coupled Device (CCD) or Complementary Metal Oxide Semiconductor (CMOS) that converts image data into electrical signals.

While taking images, light from the object passes through the first lens 11, the aperture stop S, the second lens 12, the third lens 13, the fourth lens 14, the IR cut-off filter 15, and the surface glass 16 to form an image on the image sensor 17.

The curvature radius and shape of spherical/aspherical optical surface of each lens, thickness of the lenses (d1, d3, d5 and d7) and distance of air gaps (d4, d6, d8 and d11) of the imaging lens system 1 according to the present invention satisfy the equation (4) while the field angle ω and back focal length Bf satisfy the equation (2) and the imaging lens system 1 has good aberration correction.

In optical design of the imaging lens system 1, once the optical surfaces having complicated shapes are used, the required optical effects are easily to achieve. However, the shortcoming of such design is difficulties in manufacturing. In the lens with large curvature change, it's quite difficult to made the lens with large curvature change by ground glass. Once the molded glass is used as manufacturing the lens, the yield rate is still low due to high change rate of the curvature. When plastic is used as raw material for the lens, this brings some difficulties in mold design. Moreover, due to large curvature change, the density of the melt plastic varies so that the plastic shrinkage, deformation or vein-lie pattern may occur. The fourth lens 14 is especially difficult to be manufactured. The imaging lens system 1 of the present invention uses optical surfaces with less curvature change, especially the optical surface on the object side R41 of the fourth lens 14 so that the topical surface is spherical surface without the inflection point or aspherical surface and the equation (5) is satisfied. Therefore, the manufacturing difficulties are solved and the cost is down.

The aspherical optical surface of the imaging lens system 1 satisfies the aspherical surface formula equation (6):

$$Z = \frac{ch^2}{1 + (1 - (1+K)c^2h^2)} + A_4 h^4 + \qquad (6)$$

$$A_6 h^6 + A_8 h^8 + A_{10} h^{10} + A_{12} h^{12} + A_{14} h^{14}$$

wherein c is a radius of curvature,
h represents height of lens,
K is a conic constant,
$A_4, A_6, A_8, A_{10}, A_{12}, A_{14}$ respectively are 4th, 6th, 8th, 10th, 12th, and 14$^{th}$ order aspherical coefficient.

Refer to a list one of each embodiment: the list includes data of optical surface number (#) in order from the object side to the image side (R11, R12, R21, R22, R31, R32, R41, R42 respectively represent the object side surface and the image side surface of the first lens 11, the second lens 12, the third lens 13 and the fourth lens 14), the radius of curvature R (mm) of each optical surface on the optical axis, the on-axis surface spacing d (mm) of each optical surface, the refractive index $N_d$ of each lens and the Abbe's number $v_d$ of each lens. The optical surface of the lens labeled with * is an aspherical surface. Fno, fs, 2ω respectively represent aperture value (f number), effective focal length and field angle (degree) of the imaging lens system 1. A list two includes aspheric coefficients of each optical surface in the equation (6). As shown in the following list 1, list 2 of each embodiment and figures, the imaging lens system of the present invention provides effective aberration correction and having minimized overall length.

The First Embodiment

Figure 3:
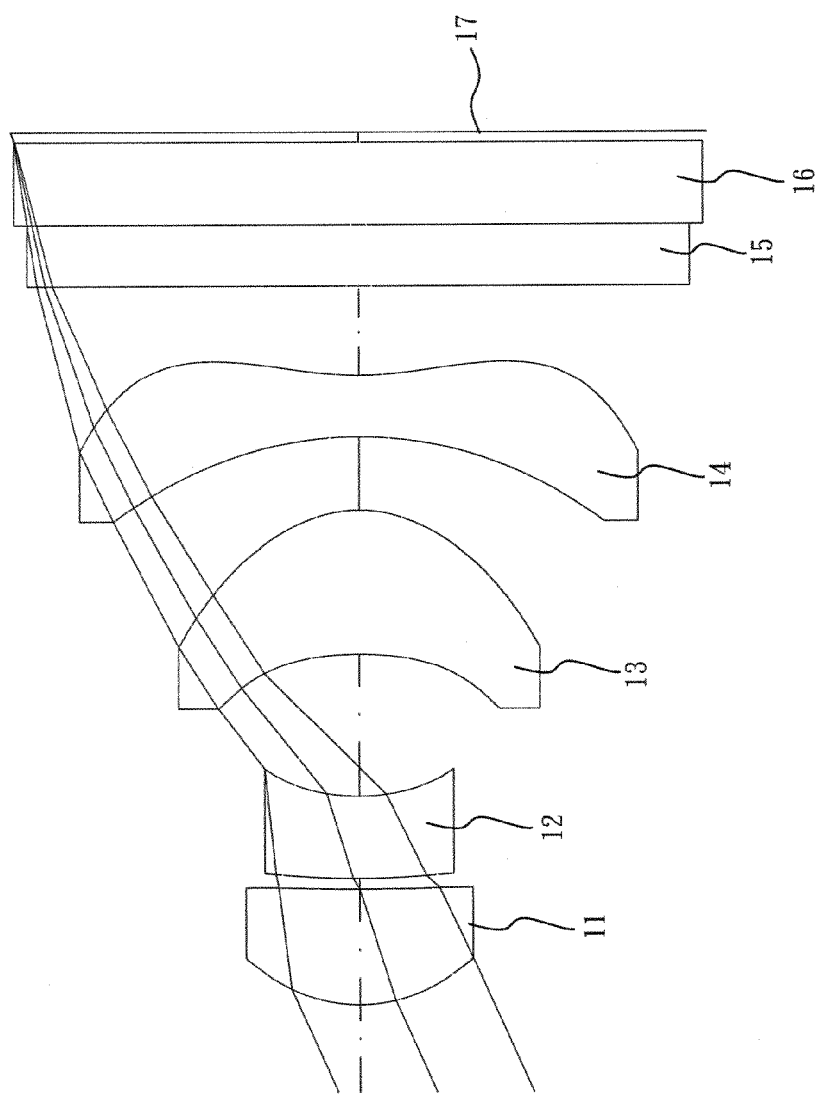
FIG. 3 is a schematic drawing showing light path of an embodiment according to the present invention.
Figure 4:
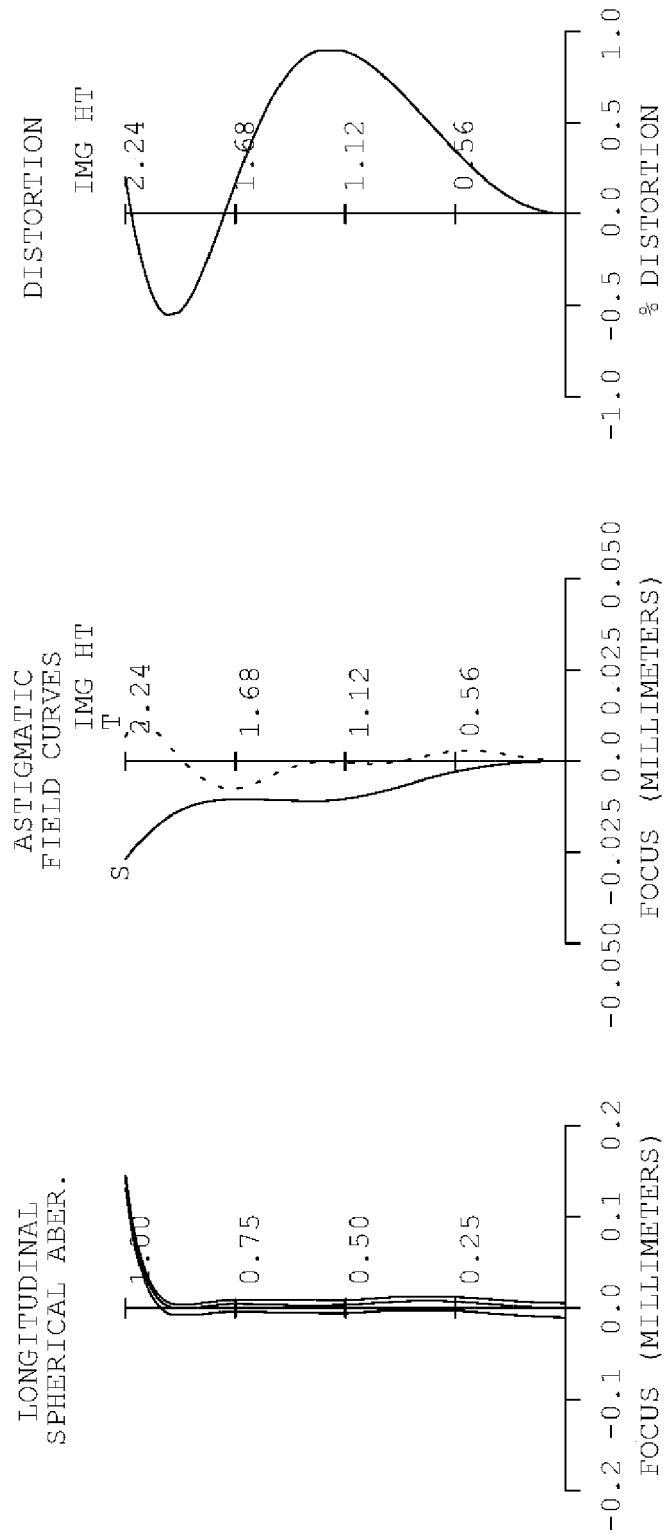
FIG. 4 shows spherical aberration, field curvature and distortion of an image of an embodiment according to the present invention.

Refer to FIG. 3 & FIG. 4, show the structure and optical path and spherical aberration, field curvature and distortion of this embodiment, respectively.

List 1
fs = 3.7484 Fno = 2.8 2ω = 62

| Surface | Lens | Radius | Thickness | Nd | Vd |
|---|---|---|---|---|---|
| Object | | | | | |
| 1 | R11 | 1.2961 | 0.6000 | 1.59 | 61.20 |
| 2(Stop) | R12 | 11.9461 | 0.0500 | | |
| 3 | *R21 | 4.8326 | 0.3000 | 1.61 | 26.32 |
| 4 | *R22 | 1.6841 | 0.7110 | | |
| 5 | *R31 | −2.3929 | 0.6578 | 1.53 | 55.74 |
| 6 | *R32 | −1.0047 | 0.3432 | | |
| 7 | R41 | −1.7430 | 0.4500 | 1.53 | 55.74 |
| 8 | *R42 | 6.6313 | 0.3500 | | |
| 9 | IR | ∞ | 0.3000 | 1.52 | 64.20 |
| 10 | Cover | ∞ | 0.4000 | 1.53 | 62.20 |
| 11 | | | 0.1249 | | |
| image | | | | | |

*aspherical surface

List 2

| | K | A4 | A6 | A8 | A10 | A12 | A14 |
|---|---|---|---|---|---|---|---|
| *R21 | −1.1279E+02 | 1.3270E−02 | 4.3947E−01 | −3.5679E+00 | 1.2240E+01 | −1.5445E+01 | 0.0000E+00 |
| *R22 | 1.0779E+00 | 6.7567E−02 | 5.4278E−02 | 1.3749E−01 | −3.8739E−01 | 1.7296E+00 | −2.2285E+00 |
| *R31 | 1.7950E−01 | −1.1257E−01 | −1.1236E−01 | 2.1514E−01 | −2.6985E−01 | −2.1555E−01 | 4.0792E−01 |
| *R32 | −1.2723E+00 | 5.6656E−02 | −1.9035E−01 | 2.5571E−01 | −2.4542E−01 | 1.0941E−01 | −1.5038E−02 |
| *R42 | −2.5677E+01 | −5.3880E−02 | 3.1848E−03 | −1.6604E−03 | 0.0000E+00 | 0.0000E+00 | 0.0000E+00 |

In this embodiment, the first lens 11 is made from glass with the refractive index $N_{d1}$ of 1.59 and Abbe's number $v_{d1}$ of 61.2, the second lens 12 is made from plastic with the refractive index $N_{d2}$ of 1.61 and Abbe's number $v_{d2}$ of 26.32, the third lens 13 is made from plastic with the refractive index $N_{d3}$ of 1.53 and Abbe's number $v_{d3}$ of 55.74 while the fourth lens 14 is made from plastic with the refractive index $N_{d4}$ of 1.53 and Abbe's number $v_{d4}$ of 55.74. The IR cut-off filter 15 is made from BK7-SCHOTT glass. The surface glass 16 is made from AF45-SCHOTT glass.

List 3
fs = 3.747 Fno = 2.8 2ω = 62

| Surface | Lens | Radius | Thickness | Nd | Vd |
|---|---|---|---|---|---|
| 11 |  |  | 0.1249 |  |  |
| image |  |  |  |  |  |

*aspherical surface

List 4

|  | K | A4 | A6 | A8 | A10 | A12 | A14 |
|---|---|---|---|---|---|---|---|
| *R21 | −7.2343E+01 | 5.5556E−02 | 3.8977E−01 | −3.5718E+00 | 1.2529E+01 | −1.5871E+01 | 0.0000E+00 |
| *R22 | 9.7463E−01 | 6.5533E−02 | 3.4367E−02 | 2.0229E−01 | −5.0848E−01 | 1.6684E+00 | −1.8190E+00 |
| *R31 | 1.5333E+00 | −1.4861E−01 | −3.7726E−02 | 2.3733E−01 | −3.6884E−01 | −2.7752E−01 | 5.5890E−01 |
| *R32 | −1.0143E+00 | 4.5169E−02 | −1.2840E−01 | 2.4696E−01 | −2.5527E−01 | 1.1133E−01 | −1.0741E−02 |
| *R41 | −5.1867E+00 | 9.9161E−03 | 0.0000E+00 | 0.0000E+00 | 0.0000E+00 | 0.0000E+00 | 0.0000E+00 |
| *R42 | −1.2659E+00 | −5.4399E−02 | 0.0000E+00 | 0.0000E+00 | 0.0000E+00 | 0.0000E+00 | 0.0000E+00 |

In this embodiment, fs is obtained 3.7484 mm, and Bf is obtained 3.0443 mm. The object surface R41 is a spherical concave surface without inflection point that is easy to be processed and manufactured. And both flare and ghost image are reduced. The effective height $H_t$ of the image side surface R42 is 1.8012 mm, the perpendicular distance from the inflection point to the optical axis H_ is 0.9687 mm, TL is 4.28 mm;

$$\frac{d2 + d4 + d6}{f_s} = 0.2946$$

$$\frac{Y \cdot \tan(\omega)}{Bf} = 0.8842$$

$$\frac{H_-}{H_t} = 53.7\%$$

$$\frac{TL}{f_s} = 1.1436$$

$$\frac{R31 + R32}{R31 - R32} = 2.4474$$

The equation (1) to equation (5) are satisfied.

As shown in FIG. 4, the imaging lens system 1 of the present invention provide effective aberration correction and the overall length thereof can be effectively reduced so as to increase applications of the present invention.

The Second Embodiment

Figure 5:
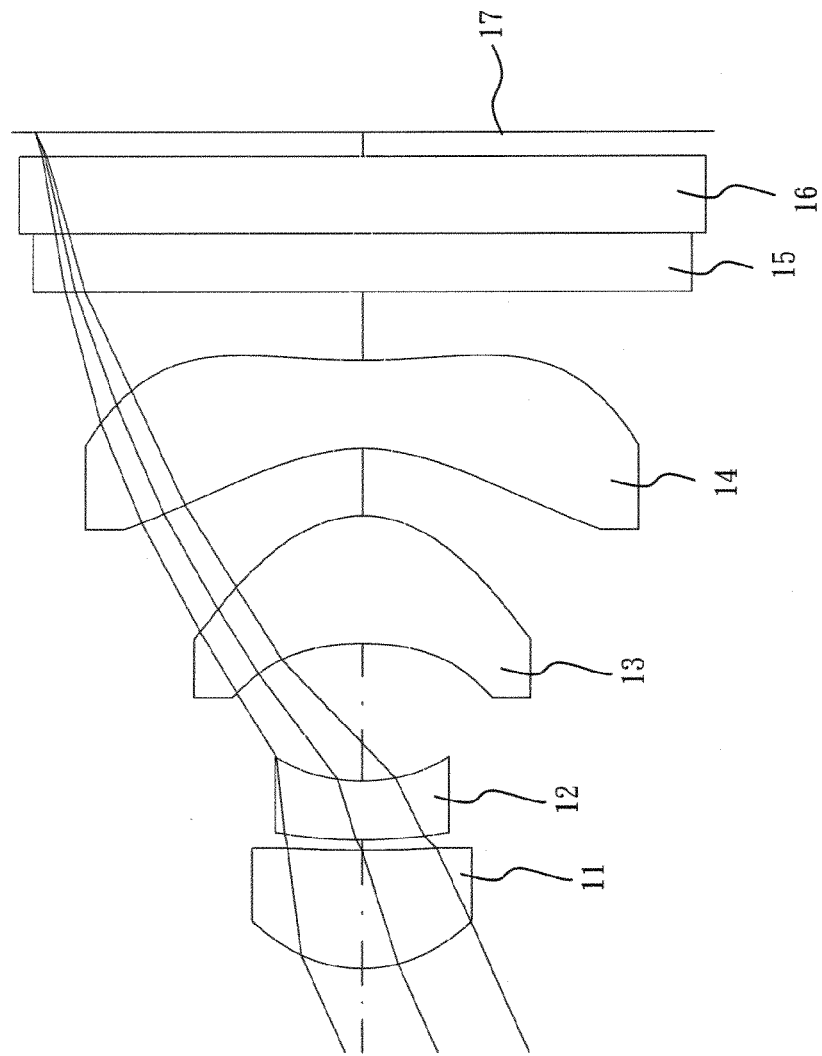
FIG. 5 is a schematic drawing showing light path of another embodiment according to the present invention.

Refer to FIG. 5.

List 3
fs = 3.747 Fno = 2.8 2ω = 62

| Surface | Lens | Radius | Thickness | Nd | Vd |
|---|---|---|---|---|---|
| Object |  |  |  |  |  |
| 1 | R11 | 1.2961 | 0.6000 | 1.59 | 61.2 |
| 2(Stop) | R12 | 11.9461 | 0.0500 |  |  |
| 3 | *R21 | 4.8326 | 0.3000 | 1.61 | 26.32 |
| 4 | *R22 | 1.6841 | 0.7110 |  |  |
| 5 | *R31 | −2.3929 | 0.6578 | 1.53 | 55.74 |
| 6 | *R32 | −1.0047 | 0.3432 |  |  |
| 7 | *R41 | −1.7430 | 0.4500 | 1.53 | 55.74 |
| 8 | *R42 | 6.6313 | 0.0500 |  |  |
| 9 | IR | ∞ | 0.3000 | 1.52 | 64.2 |
| 10 | Cover | ∞ | 0.4000 | 1.53 | 62.2 |

In this embodiment, the first lens 11 is made from glass with the refractive index $N_{d1}$ of 1.59 and Abbe's number $v_{d1}$ of 61.2, the second lens 12 is made from plastic with the refractive index $N_{d2}$ of 1.61 and Abbe's number $v_{d2}$ of 26.32, the third lens 13 is made from plastic with the refractive index $N_{d3}$ of 1.53 and Abbe's number $v_{d3}$ of 55.74 while the fourth lens 14 is made from plastic with the refractive index $N_{d4}$ of 1.53 and Abbe's number $v_{d4}$ of 55.74. The IR cut-off filter 15 is made from BK7-SCHOTT glass. The surface glass 16 is made from AF45-SCHOTT glass.

In this embodiment, fs is obtained 3.747 mm, and Bf is obtained 3.0443 mm. The object surface R41 is an aspherical concave surface without inflection point and is easy to be processed and manufactured while both flare and ghost image are reduced. The effective height $H_t$ of the image side surface R42 is 1.8965 mm, the perpendicular distance from the inflection point to the optical axis H_ is 0.819 mm, TL is 3.99 mm;

$$\frac{d2 + d4 + d6}{f_s} = 0.2947$$

$$\frac{Y \cdot \tan(\omega)}{Bf} = 0.8842$$

$$\frac{H_-}{H_t} = 43.2\%$$

$$\frac{TL}{f_s} = 1.064$$

$$\frac{R31 + R32}{R31 - R32} = 2.4474$$

The equation (1) to equation (5) are satisfied by above parameters.

Figure 6:
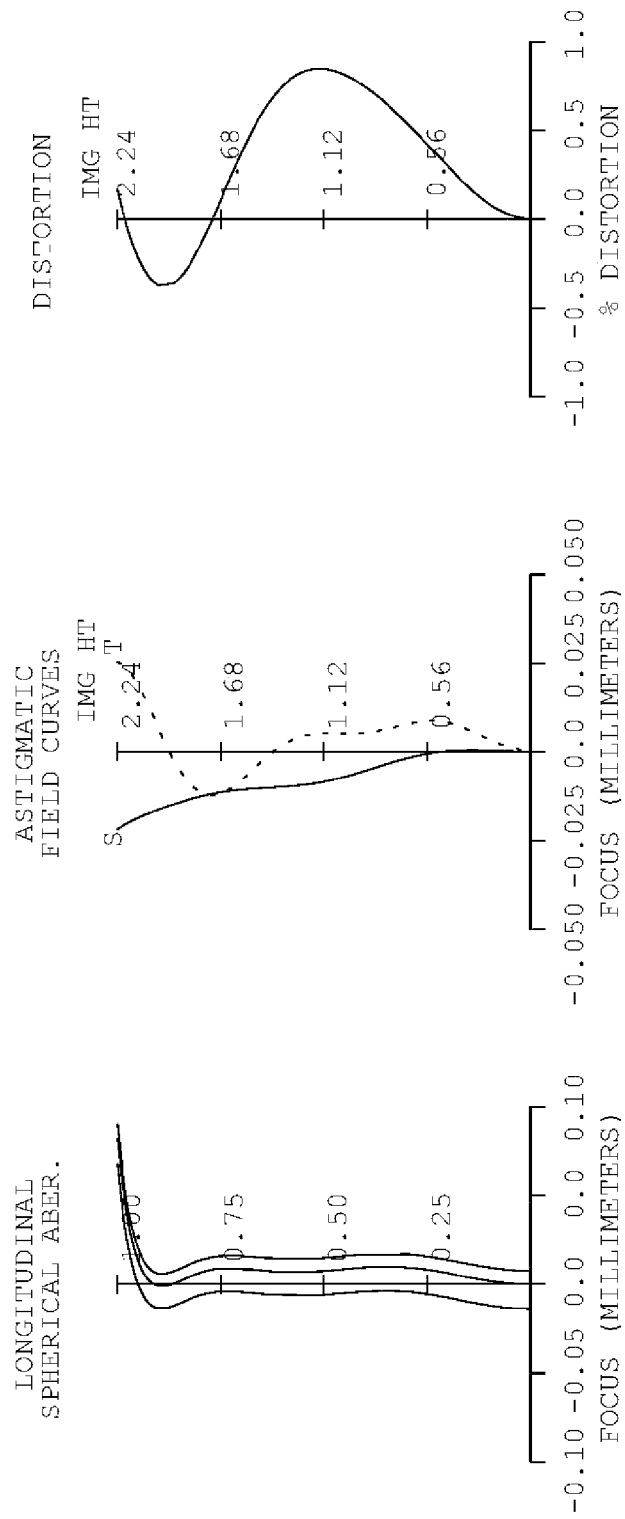
FIG. 6 shows spherical aberration, field curvature and distortion of an image of another embodiment according to the present invention.

As shown in FIG. 6, the imaging lens system 1 of the present invention provide effective aberration correction and the overall length thereof can be effectively reduced so as to increase applications of the present invention.

The Third Embodiment

Figure 7:
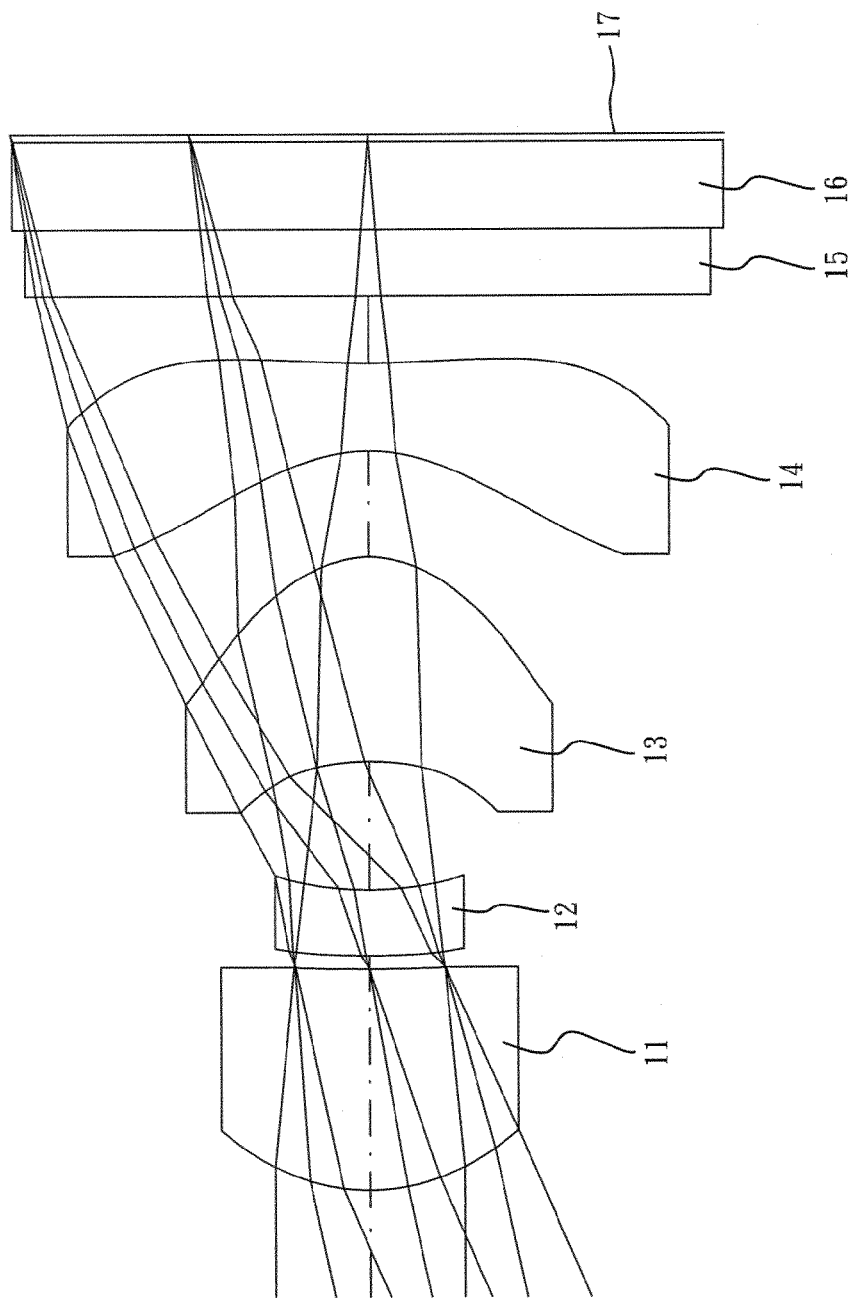
FIG. 7 is a schematic drawing showing light path of the third embodiment according to the present invention.

Refer to FIG. 7.

List 5
fs = 3.7186 Fno = 2.8 2ω = 62

| Surface | Lens | Radius | Thickness | Nd | Vd |
|---|---|---|---|---|---|
| Object | | | | | |
| 1 | R11 | 1.7142 | 1.0007 | 1.59 | 61.2 |
| 2(Stop) | *R12 | 44.0890 | 0.0598 | | |
| 3 | *R21 | 8.0779 | 0.3000 | 1.59 | 61.2 |
| 4 | *R22 | 3.0039 | 0.5830 | | |
| 5 | *R31 | −2.2239 | 0.9226 | 1.58 | 59.4 |
| 6 | *R32 | −0.9747 | 0.4810 | | |
| 7 | *R41 | −1.4376 | 0.4000 | 1.58 | 59.4 |
| 8 | *R42 | 9.3913 | 0.3035 | | |
| 9 | IR | ∞ | 0.3000 | 1.52 | 64.2 |
| 10 | Cover | ∞ | 0.4000 | 1.53 | 62.2 |
| 11 | | | 0.0331 | | |
| image | | | | | |

*aspherical surface

List 6

| | K | A4 | A6 | A8 | A10 | A12 | A14 |
|---|---|---|---|---|---|---|---|
| *R12 | 5.7043E+03 | 1.0362E−01 | −1.4221E−01 | 0.0000E+00 | 0.0000E+00 | 0.0000E+00 | 0.0000E+00 |
| *R21 | −5.4186E+00 | 1.2622E−01 | 3.1406E−01 | −3.7062E+00 | 1.3180E+01 | −1.6266E+01 | 0.0000E+00 |
| *R22 | −1.1271E+00 | 7.1043E−02 | −5.2649E−02 | 1.0406E−01 | −2.6344E−01 | 1.0380E+00 | −5.6416E−01 |
| *R31 | 1.5959E+00 | −1.6426E−01 | −5.0003E−02 | 2.3814E−01 | −4.2407E−01 | −2.2859E−01 | 8.0096E−01 |
| *R32 | −7.3641E−01 | 5.8734E−02 | −1.2788E−01 | 2.3658E−01 | −2.4453E−01 | 1.1636E−01 | −1.2160E−02 |
| *R41 | −3.0797E+00 | 2.0432E−02 | 0.0000E+00 | 0.0000E+00 | 0.0000E+00 | 0.0000E+00 | 0.0000E+00 |
| *R42 | −5.5640E−03 | −3.8142E−02 | 0.0000E+00 | 0.0000E+00 | 0.0000E+00 | 0.0000E+00 | 0.0000E+00 |

In this embodiment, the first lens 11 is made from glass with the refractive index $N_{d1}$ of 1.59 and Abbe's number $v_{d1}$ of 61.2, the second lens 12 is made from glass with the refractive index $N_{d2}$ of 1.59 and Abbe's number $v_{d2}$ of 61.2, the third lens 13 is made from glass with the refractive index $N_{d3}$ of 1.58 and Abbe's number $v_{d3}$ of 59.4 while the fourth lens 14 is made from glass with the refractive index $N_{d4}$ of 1.58 and Abbe's number $v_{d4}$ of 59.4. The IR cut-off filter 15 is made from BK7-SCHOTT glass. The surface glass 16 is made from AF45-SCHOTT glass.

In this embodiment, fs is obtained 3.7186 mm, and Bf is obtained 1.0366 mm. The object surface R41 is an aspherical concave surface without inflection point and is easy to be processed and manufactured while both flare and ghost image are reduced. The effective height $H_t$ of the image side surface R42 is 2.0289 mm, the perpendicular distance from the inflection point to the optical axis $H_-$ is 0.9075 mm, TL is 4.78 mm;

$$\frac{d2+d4+d6}{f_s} = 0.3022$$

$$\frac{Y \cdot \tan(\omega)}{Bf} = 2.5968$$

$$\frac{H_-}{H_t} = 44.7\%$$

$$\frac{TL}{f_s} = 1.2864$$

$$\frac{R31+R32}{R31-R32} = 2.5606$$

The equation (1) to equation (5) are satisfied by above parameters.

Figure 8:
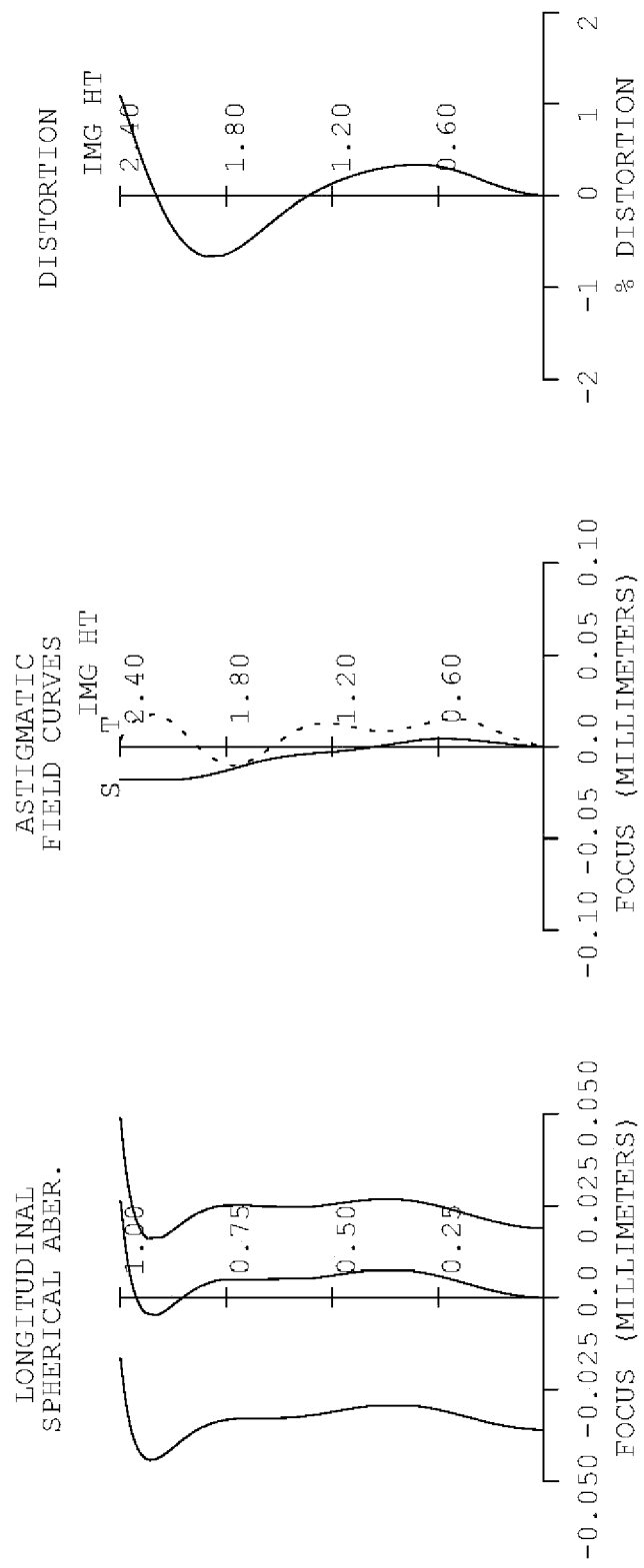
FIG. 8 shows spherical aberration, field curvature and distortion of an image of the third embodiment according to the present invention.

As shown in FIG. 8, the imaging lens system 1 of the present invention provide effective aberration correction and the overall length thereof can be effectively reduced so as to increase applications of the present invention.

The Fourth Embodiment

Figure 9:
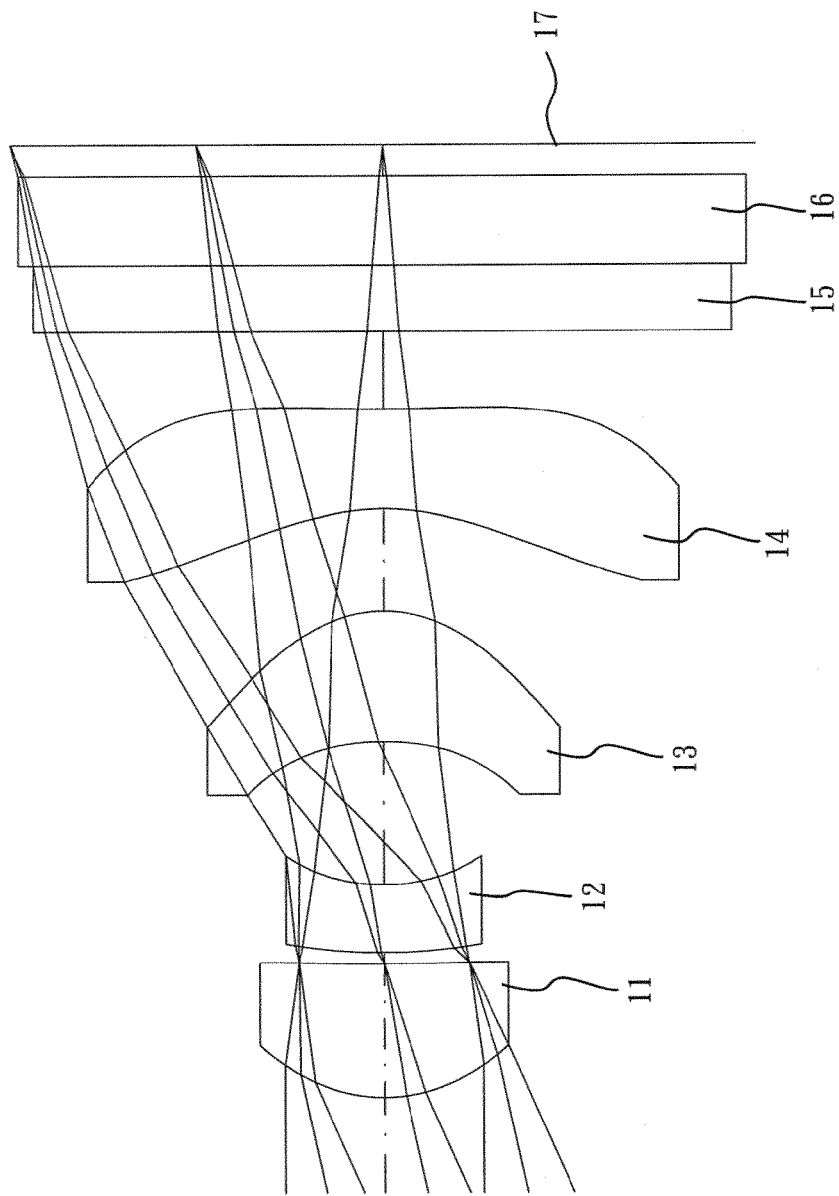
FIG. 9 is a schematic drawing showing light path of the fourth embodiment according to the present invention.

Refer to FIG. 9.

List 7
fs = 3.75 Fno = 2.8 2ω = 62

| Surface | Lens | Radius | Thickness | Nd | Vd |
|---|---|---|---|---|---|
| Object | | | | | |
| 1 | R11 | 1.3150 | 0.6000 | 1.59 | 61.2 |
| 2(Stop) | *R12 | 63.5630 | 0.0500 | | |
| 3 | *R21 | 5.4564 | 0.3000 | 1.61 | 26.32 |
| 4 | *R22 | 1.5731 | 0.6485 | | |
| 5 | *R31 | −1.9216 | 0.5858 | 1.53 | 55.74 |
| 6 | *R32 | −1.0169 | 0.4528 | | |
| 7 | *R41 | −1.9200 | 0.4500 | 1.53 | 55.74 |
| 8 | *R42 | 14.9300 | 0.3500 | | |
| 9 | IR | ∞ | 0.3000 | 1.52 | 64.2 |
| 10 | Cover | ∞ | 0.4000 | 1.53 | 62.2 |
| 11 | | ∞ | 0.1437 | | |
| image | | | | | |

*aspherical surface

| | K | A4 | A6 | A8 | A10 | A12 | A14 |
|---|---|---|---|---|---|---|---|
| | | | | List 8 | | | |
| *R12 | −8.3779E−01 | 1.0200E−01 | −1.1879E−01 | 0.0000E+00 | 0.0000E+00 | 0.0000E+00 | 0.0000E+00 |
| *R21 | −3.1100E+01 | 1.1842E−01 | 3.6418E−01 | −3.9743E+00 | 1.3320E+01 | −1.6265E+01 | 0.0000E+00 |
| *R22 | 7.6219E−01 | 7.4505E−02 | −4.6037E−02 | 2.3289E−01 | −2.1494E−01 | 7.1997E−01 | −9.8624E−01 |
| *R31 | 3.9534E−01 | −1.2191E−01 | −4.2525E−02 | 2.4137E−01 | −4.5088E−01 | −2.5330E−01 | 7.7671E−01 |
| *R32 | −8.4216E−01 | 4.5005E−02 | −1.1982E−01 | 2.3549E−01 | −2.4629E−01 | 1.1656E−01 | −1.0718E−02 |
| *R41 | −5.8360E+00 | 1.2068E−02 | 0.0000E+00 | 0.0000E+00 | 0.0000E+00 | 0.0000E+00 | 0.0000E+00 |
| *R42 | −3.5714E−01 | −4.5481E−02 | 0.0000E+00 | 0.0000E+00 | 0.0000E+00 | 0.0000E+00 | 0.0000E+00 |

In this embodiment, the first lens 11 is made from glass with the refractive index $N_{d1}$ of 1.59 and Abbe's number $v_{d1}$ of 61.2, the second lens 12 is made from plastic with the refractive index $N_{d2}$ of 1.61 and Abbe's number $v_{d2}$ of 26.32, the third lens 13 is made from plastic with the refractive index $N_{d3}$ of 1.53 and Abbe's number $v_{d3}$ of 55.74 while the fourth lens 14 is made from plastic with the refractive index $N_{d4}$ of 1.53 and Abbe's number $v_{d4}$ of 55.74. The IR cut-off filter 15 is made from BK7-SCHOTT glass. The surface glass 16 is made from AF45-SCHOTT glass.

In this embodiment, fs is obtained 3.750 mm, and Bf is obtained 1.1936 mm. The object surface R41 is an aspherical concave surface without inflection point and is easy to be processed and manufactured while both flare and ghost image are reduced. The effective height $H_t$ of the image side surface R42 is 1.9055 mm, the perpendicular distance from the inflection point to the optical axis H_ is 0.8424 mm, TL is 4.28 mm;

$$\frac{d2 + d4 + d6}{f_s} = 0.3070$$

$$\frac{Y \cdot \tan(\omega)}{Bf} = 2.2552$$

$$\frac{H_-}{H_t} = 44.21\%$$

$$\frac{TL}{f_s} = 1.1415$$

$$\frac{R31 + R32}{R31 - R32} = 3.2477$$

The equation (1) to equation (5) are satisfied by above parameters.

Figure 10:
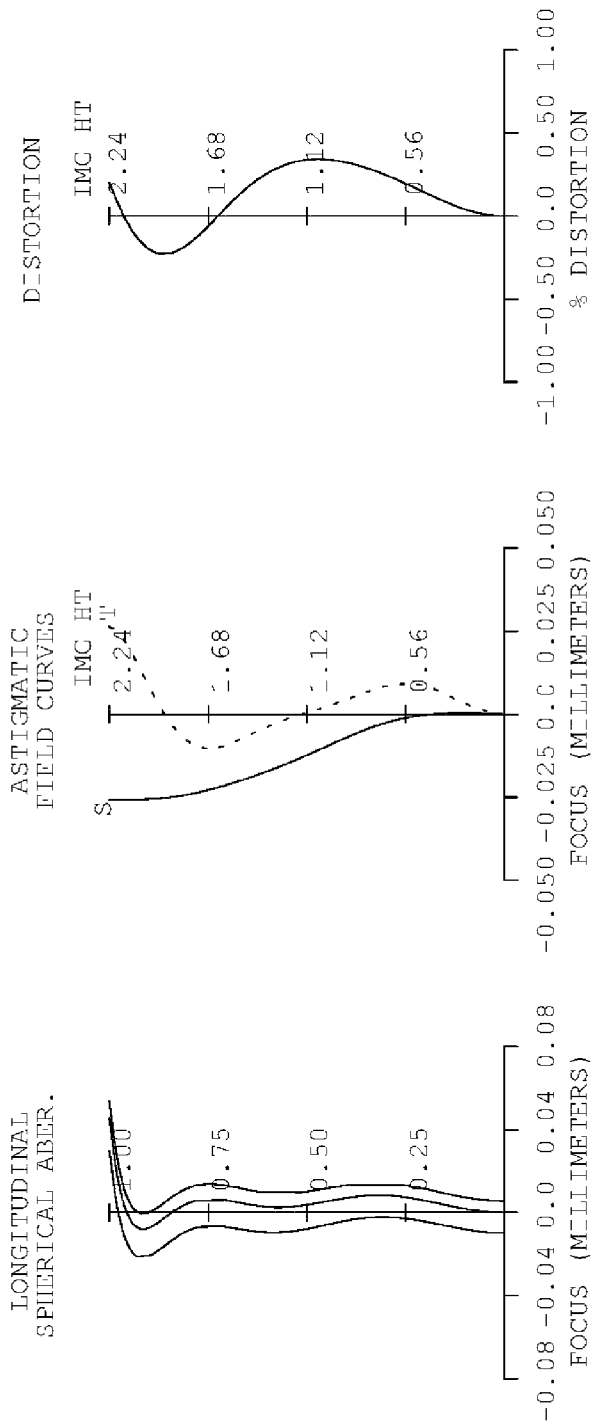
FIG. 10 shows spherical aberration, field curvature and distortion of an image of the fourth embodiment according to the present invention.

As shown in FIG. 10, the imaging lens system 1 of the present invention provide effective aberration correction and the overall length thereof can be effectively reduced so as to increase applications of the present invention.

The Fifth Embodiment

Figure 11:
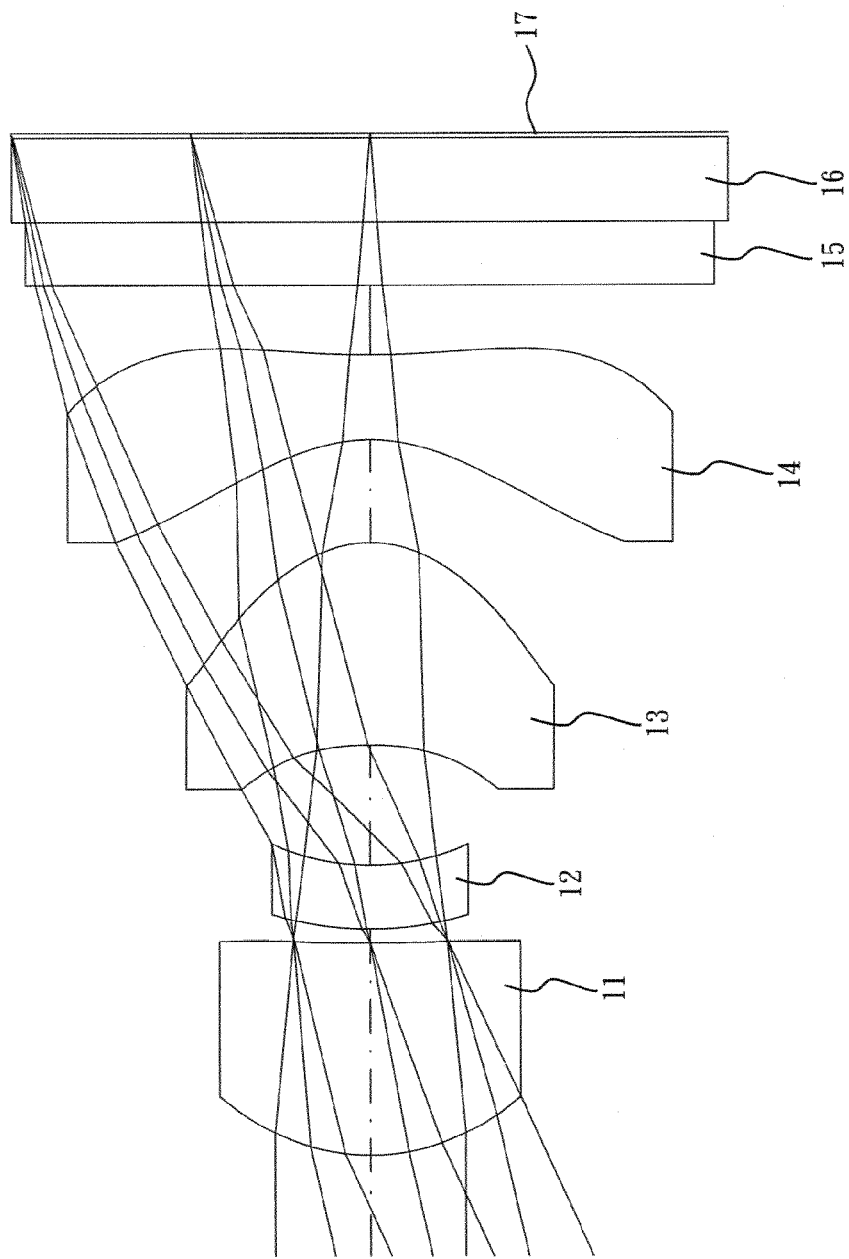
FIG. 11 is a schematic drawing showing light path of the fifth embodiment according to the present invention.

Refer to FIG. 11.

List 9
fs = 3.7471 Fno = 2.8 2ω = 62

| Surface | Lens | Radius | Thickness | Nd | Vd |
|---|---|---|---|---|---|
| Object | | | | | |
| 1 | *R11 | 2.0270 | 1.3000 | 1.54 | 56 |
| 2(Stop) | *R12 | 13.5107 | 0.0796 | | |
| 3 | *R21 | 2.6210 | 0.3000 | 1.54 | 56 |
| 4 | *R22 | 2.3738 | 0.5307 | | |
| 5 | *R31 | −2.4646 | 1.0206 | 1.54 | 56 |
| 6 | *R32 | −0.9103 | 0.4992 | | |
| 7 | *R41 | −1.3523 | 0.4000 | 1.54 | 56 |
| 8 | *R42 | 5.7385 | 0.3016 | | |
| 9 | IR | ∞ | 0.3000 | 1.52 | 64.2 |
| 10 | Cover | ∞ | 0.4000 | 1.53 | 62.2 |
| 11 | | | 0.0588 | | |
| image | | | | | |

*aspherical surface

| | K | A4 | A6 | A8 | A10 | A12 | A14 |
|---|---|---|---|---|---|---|---|
| | | | | List 10 | | | |
| *R11 | 1.7706E−01 | −1.1006E−03 | 0.0000E+00 | 0.0000E+00 | 0.0000E+00 | 0.0000E+00 | 0.0000E+00 |
| *R12 | −3.5714E+01 | 7.6626E−02 | −7.6752E−02 | 0.0000E+00 | 0.0000E+00 | 0.0000E+00 | 0.0000E+00 |
| *R21 | −8.5374E+00 | 1.0227E−01 | 3.3213E−01 | −3.6233E+00 | 1.2368E+01 | −1.5030E+01 | 0.0000E+00 |
| *R22 | −4.7402E+00 | 3.6071E−02 | −5.8807E−02 | 8.3431E−03 | −2.7492E−01 | 1.1869E+00 | −1.2354E+00 |
| *R31 | 1.9900E+00 | −1.8619E−01 | −5.5440E−03 | 2.0746E−01 | −4.3817E−01 | −2.3130E−01 | 7.9762E−01 |
| *R32 | −7.5187E−01 | 7.4326E−02 | −1.3193E−01 | 2.3854E−01 | −2.4322E−01 | 1.1663E−01 | −1.1855E−02 |
| *R41 | −2.9167E+00 | 2.2215E−02 | 0.0000E+00 | 0.0000E+00 | 0.0000E+00 | 0.0000E+00 | 0.0000E+00 |
| *R42 | −1.4512E+00 | −4.4454E−02 | 0.0000E+00 | 0.0000E+00 | 0.0000E+00 | 0.0000E+00 | 0.0000E+00 |

In this embodiment, for economizing the material cost, the first lens 11, second lens 12, third lens 13 and fourth lens 14 are made from plastic with the refractive index $N_d$ of 1.54 and Abbe's number $v_d$ of 56 respectively. The IR cut-off filter 15 is made from BK7-SCHOTT glass. The surface glass 16 is made from AF45-SCHOTT glass.

In this embodiment, fs is obtained 3.7471 mm, and Bf is obtained 1.0604 mm. The object surface R41 is an aspherical concave surface without inflection point and is easy to be processed and manufactured while both flare and ghost image are reduced. The effective height $H_t$ of the image side surface R42 is 2.0966 mm, the perpendicular distance from the inflection point to the optical axis H_ is 1.098 mm, TL is 5.19 mm;

$$\frac{d2 + d4 + d6}{f_s} = 0.2961$$

$$\frac{Y \cdot \tan(\omega)}{Bf} = 2.5385$$

$$\frac{H_-}{H_t} = 52.4\%$$

$$\frac{TL}{f_s} = 1.3852$$

$$\frac{R31 + R32}{R31 - R32} = 2.1714$$

The equation (1) to equation (5) are satisfied by above parameters.

Figure 12:
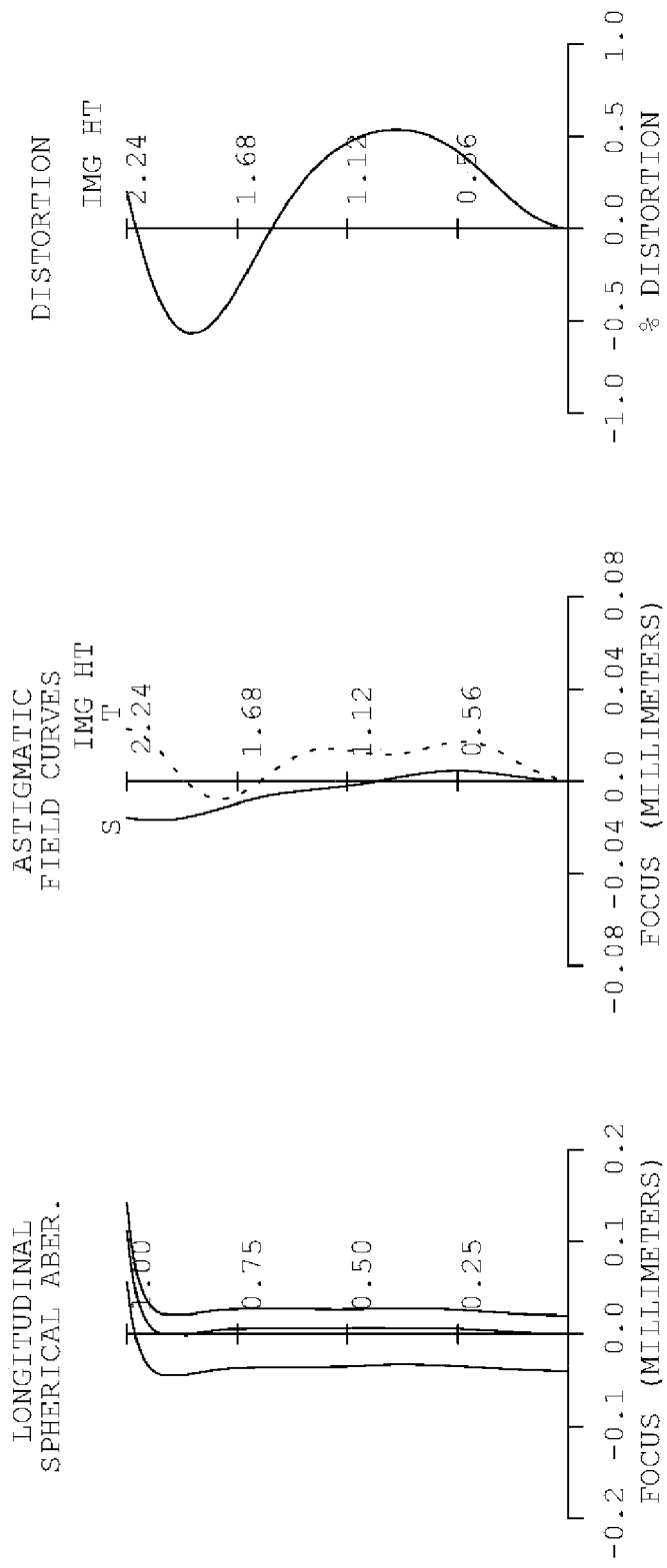
FIG. 12 shows spherical aberration, field curvature and distortion of an image of the fourth embodiment according to the present invention.

As shown in FIG. 12, the imaging lens system 1 of the present invention provide effective aberration correction and the overall length thereof can be effectively reduced so as to increase applications of the present invention.

The Sixth Embodiment

Figure 13:
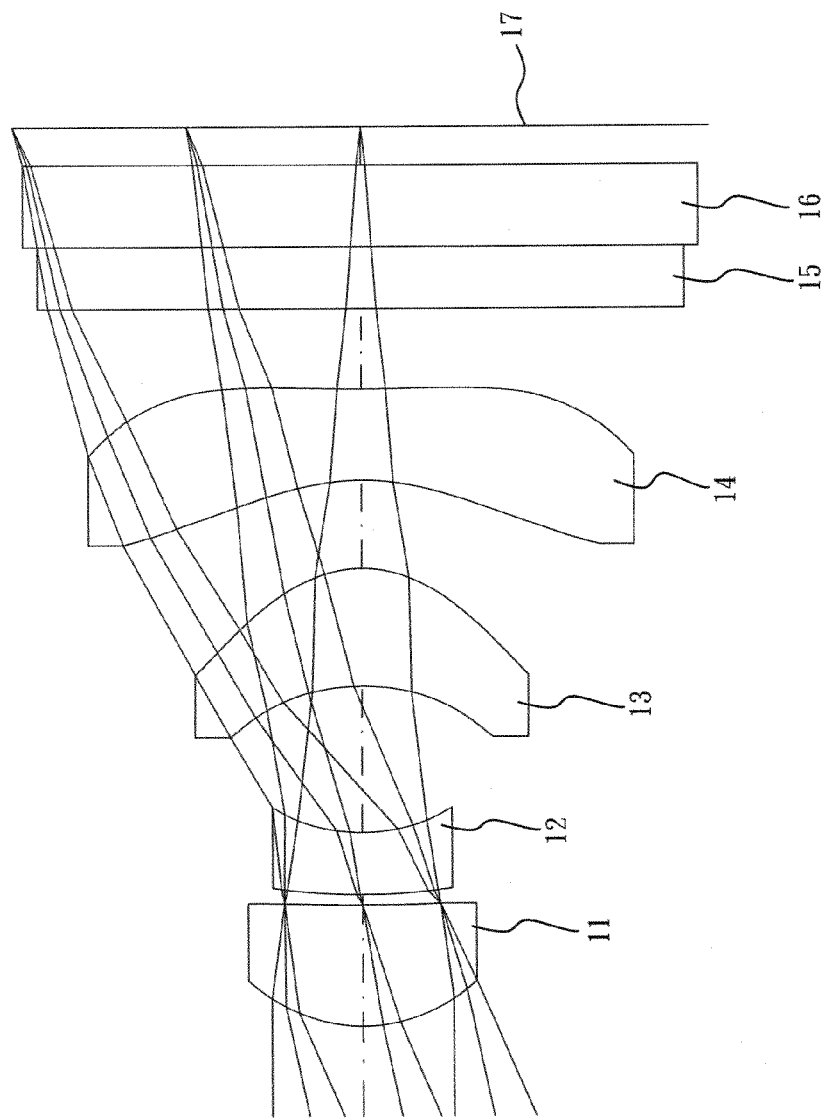
FIG. 13 is a schematic drawing showing light path of the sixth embodiment according to the present invention.

Refer to FIG. 13.

List 11
fs = 3.9247 Fno = 2.8 2ω = 60

| Surface | Lens | Radius | Thickness | Nd | Vd |
|---|---|---|---|---|---|
| Object |  |  |  |  |  |
| 1 | R11 | 1.3150 | 0.6000 | 1.59 | 61.2 |
| 2(Stop) | *R12 | 63.5630 | 0.0500 |  |  |
| 3 | *R21 | 6.9850 | 0.3000 | 1.59 | 30 |
| 4 | *R22 | 1.6076 | 0.7194 |  |  |
| 5 | *R31 | −1.8910 | 0.5687 | 1.53 | 55.74 |
| 6 | *R32 | −1.0137 | 0.4280 |  |  |
| 7 | *R41 | −1.9200 | 0.4500 | 1.53 | 55.74 |
| 8 | *R42 | 14.9300 | 0.3922 |  |  |
| 9 | IR | ∞ | 0.3000 | 1.52 | 64.2 |
| 10 | Cover | ∞ | 0.4000 | 1.53 | 62.2 |
| 11 |  |  | 0.1875 |  |  |
| image |  |  |  |  |  |

*aspherical surface

In this embodiment, the first lens 11 is made from glass with the refractive index $N_{d1}$ of 1.59 and Abbe's number $v_{d1}$ of 61.2, the second lens 12 is made from plastic with the refractive index $N_{d2}$ of 1.59 and Abbe's number $v_{d2}$ of 30, the third lens 13 is made from plastic with the refractive index $N_{d3}$ of 1.53 and Abbe's number $v_{d3}$ of 55.74 while the fourth lens 14 is made from plastic with the refractive index $N_{d4}$ of 1.53 and Abbe's number $v_{d4}$ of 55.74. The IR cut-off filter 15 is made from BK7-SCHOTT glass. The surface glass 16 is made from AF45-SCHOTT glass.

In this embodiment, fs obtained is 3.9247 mm, and Bf is obtained 1.2797 mm. The object surface R41 is an aspherical concave surface without inflection point and is easy to be processed and manufactured while both flare and ghost image are reduced. The effective height $H_t$ of the image side surface R42 is 1.8822 mm, the perpendicular distance from the inflection point to the optical axis H_ is 0.7948 mm, TL is 4.39 mm;

$$\frac{d2 + d4 + d6}{f_s} = 0.3051$$

$$\frac{Y \cdot \tan(\omega)}{Bf} = 2.0212$$

$$\frac{H_-}{H_t} = 42.23\%$$

$$\frac{TL}{f_s} = 1.120$$

$$\frac{R31 + R32}{R31 - R32} = 3.311$$

The equation (1) to equation (5) are satisfied by above parameters.

Figure 14:
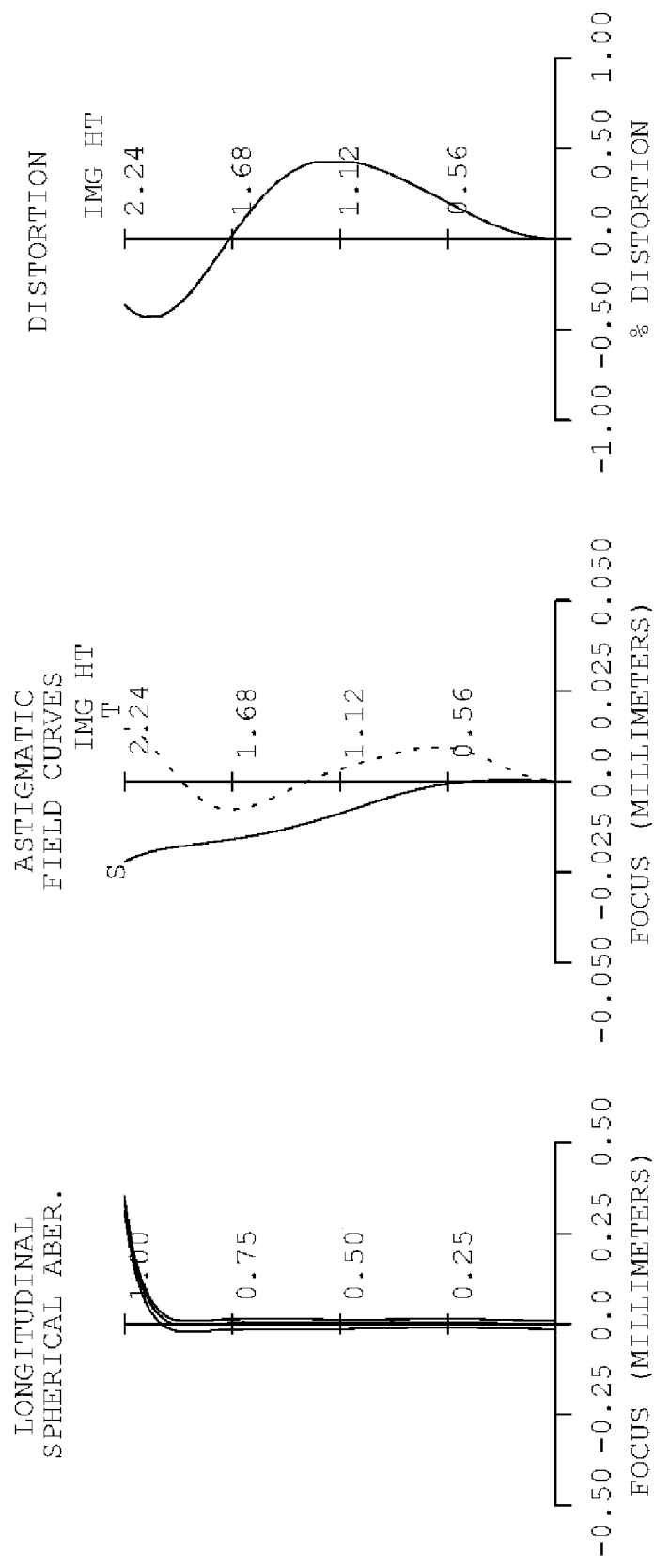
FIG. 14 shows spherical aberration, field curvature and distortion of an image of the sixth embodiment according to the present invention.

As shown in FIG. 14, the imaging lens system 1 of the present invention provide effective aberration correction and the overall length thereof can be effectively reduced so as to increase applications of the present invention.

The Seventh Embodiment

Figure 15:
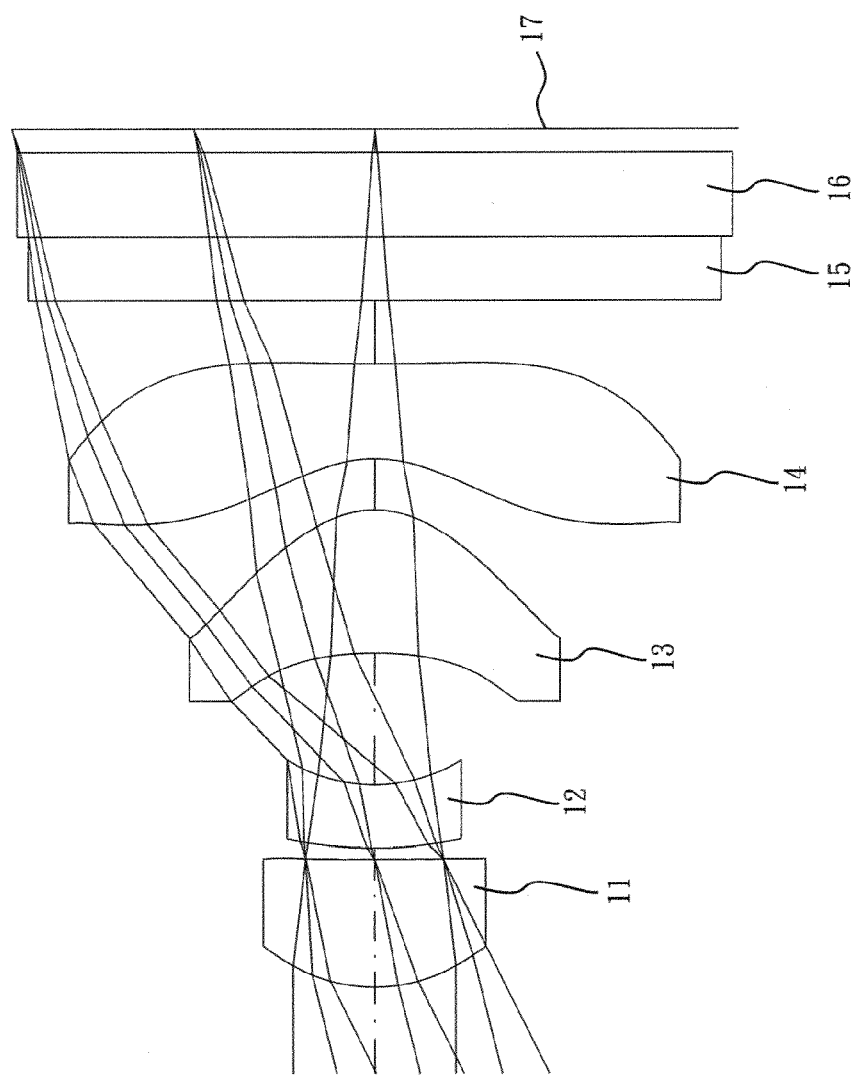
FIG. 15 is a schematic drawing showing light path of the seventh embodiment according to the present invention.

Refer to FIG. 15.

List 13
fs = 3.4402 Fno = 2.8 2ω = 66.2

| Surface | Lens | Radius | Thickness | Nd | Vd |
|---|---|---|---|---|---|
| Object |  |  |  |  |  |
| 1 | R11 | 1.3150 | 0.6000 | 1.59 | 61.2 |
| 2(Stop) | *R12 | 63.5630 | 0.0500 |  |  |

List 12

|  | K | A4 | A6 | A8 | A10 | A12 | A14 |
|---|---|---|---|---|---|---|---|
| *R12 | −1.0000E+00 | 1.0200E−01 | −1.1879E−01 | 0.0000E+00 | 0.0000E+00 | 0.0000E+00 | 0.0000E+00 |
| *R21 | −2.7969E+01 | 1.2334E−01 | 2.9064E−01 | −3.6382E+00 | 1.2731E+01 | −1.6265E+01 | 0.0000E+00 |
| *R22 | 1.2710E+00 | 8.5849E−02 | −1.7224E−02 | −9.9426E−03 | 3.5649E−01 | 1.4857E−01 | −9.8626E−01 |
| *R31 | −2.5054E−01 | −1.4117E−01 | 3.3011E−02 | 1.2928E−01 | −4.1787E−01 | 2.4815E−01 | 1.5372E−01 |
| *R32 | −9.8861E−01 | 4.0442E−02 | −8.7909E−02 | 1.9441E−01 | −1.9996E−01 | 1.0480E−01 | −1.7070E−02 |
| *R41 | −6.9660E+00 | 1.2068E−02 | 0.0000E+00 | 0.0000E+00 | 0.0000E+00 | 0.0000E+00 | 0.0000E+00 |
| *R42 | −1.0000E+00 | −4.5481E−02 | 0.0000E+00 | 0.0000E+00 | 0.0000E+00 | 0.0000E+00 | 0.0000E+00 |

-continued

List 13
fs = 3.4402 Fno = 2.8 2ω = 66.2

| Surface | Lens | Radius | Thickness | Nd | Vd |
|---|---|---|---|---|---|
| 3 | *R21 | 3.5519 | 0.3000 | 1.59 | 30 |
| 4 | *R22 | 1.3347 | 0.6274 | | |
| 5 | *R31 | −2.9381 | 0.6728 | 1.53 | 55.74 |
| 6 | *R32 | −0.8027 | 0.2446 | | |
| 7 | *R41 | −1.0477 | 0.4500 | 1.53 | 55.74 |
| 8 | *R42 | 14.7194 | 0.3000 | | |
| 9 | IR | ∞ | 0.3000 | 1.52 | 64.2 |
| 10 | Cover | ∞ | 0.4000 | 1.53 | 62.2 |
| 11 image | | | 0.1053 | | |

*aspherical surface

List 14

| | K | A4 | A6 | A8 | A10 | A12 | A14 |
|---|---|---|---|---|---|---|---|
| *R12 | −9.0475E−01 | 1.0200E−01 | −1.1879E−01 | 0.0000E+00 | 0.0000E+00 | 0.0000E+00 | 0.0000E+00 |
| *R21 | 2.0445E−01 | 7.2639E−02 | 1.3150E−01 | −2.5498E+00 | 1.0784E+01 | −1.6439E+01 | 0.0000E+00 |
| *R22 | −2.1173E−01 | 8.2616E−02 | −3.7401E−01 | 2.4329E+00 | −1.4882E+00 | −2.4127E+01 | 5.3395E+01 |
| *R31 | 7.6536E+00 | −1.5287E−01 | −4.4648E−02 | 6.0543E−01 | −1.0436E+00 | 1.7592E−01 | 6.4101E−01 |
| *R32 | −1.4093E+00 | 4.7128E−02 | −1.3406E−01 | 2.0393E−01 | −8.2276E−02 | −4.2742E−02 | 3.1844E−02 |
| *R41 | −2.9173E+00 | 1.2329E−01 | −3.3173E−02 | 3.2990E−03 | 0.0000E+00 | 0.0000E+00 | 0.0000E+00 |
| *R42 | 2.4605E+01 | −4.5961E−02 | 0.0000E+00 | 0.0000E+00 | 0.0000E+00 | 0.0000E+00 | 0.0000E+00 |

In this embodiment, the first lens 11 is made from glass with the refractive index $N_{d1}$ of 1.59 and Abbe's number $v_{d1}$ of 61.2, the second lens 12 is made from plastic with the refractive index $N_{d2}$ of 1.59 and Abbe's number $v_{d2}$ of 30, the third lens 13 is made from plastic with the refractive index $N_{d3}$ of 1.53 and Abbe's number $v_{d3}$ of 55.74 while the fourth lens 14 is made from plastic with the refractive index $N_{d4}$ of 1.53 and Abbe's number $v_{d4}$ of 55.74. The IR cut-off filter 15 is made from BK7-SCHOTT glass. The surface glass 16 is made from AF45-SCHOTT glass.

In this embodiment, fs is obtained 3.4402 mm, and Bf is obtained 1.1052 mm. The object surface R41 is an aspherical concave surface without inflection point and is easy to be processed and manufactured while both flare and ghost image are reduced. The effective height $H_t$ of the image side surface R42 is 1.8854 mm, the perpendicular distance from the inflection point to the optical axis H_ is 0.809 mm, TL is 4.05 mm;

$$\frac{d2 + d4 + d6}{f_s} = 0.2680$$

$$\frac{Y \cdot \tan(\omega)}{Bf} = 2.2463$$

$$\frac{H_-}{H_t} = 42.9\%$$

$$\frac{TL}{f_s} = 1.177$$

$$\frac{R31 + R32}{R31 - R32} = 1.7517$$

The equation (1) to equation (5) are satisfied by above parameters.

Figure 16:
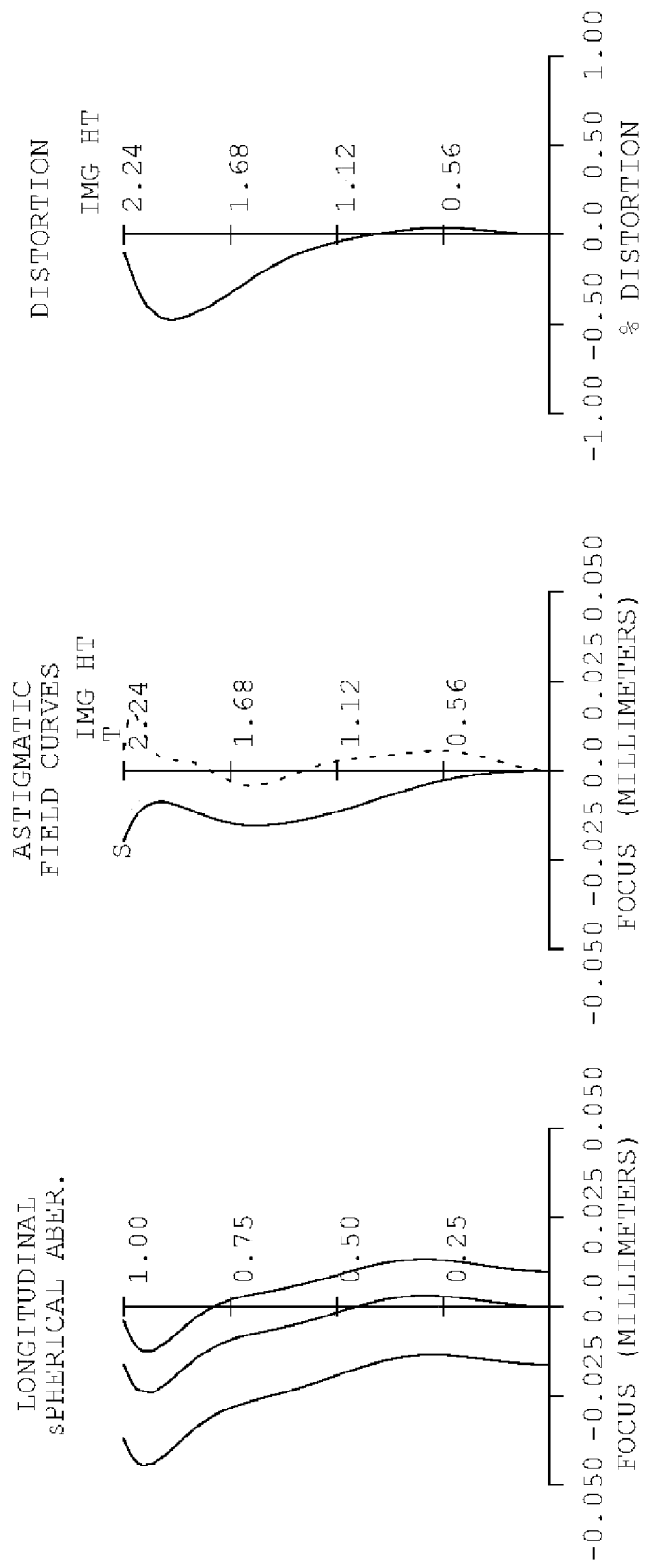
FIG. 16 shows spherical aberration, field curvature and distortion of an image of the seventh embodiment according to the present invention.

As shown in FIG. 16, the imaging lens system 1 of the present invention provide effective aberration correction and the overall length thereof can be effectively reduced so as to increase applications of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A short overall length imaging lens system with four lenses along an optical axis from an object side to an image side comprising:
a first lens with positive power that is a meniscus lens with a convex surface on the object side,
an aperture stop,
a second lens with negative power that is a meniscus lens with a convex surface facing the object side and at least one aspherical optical surface,
a third lens with positive power that is a meniscus lens with a concave surface on the object side and at least one aspherical optical surface, and
a fourth lens with negative power that is a biconcave lens with an aspherical surface on the image side and at least one inflection point in effective diameter range ranging from a lens center to lens edge on the image side;
wherein the imaging lens system satisfied the equations:

$$0.25 \leq \frac{d2 + d4 + d6}{f_s} \leq 0.40$$

$$0.8 \leq \frac{Y \cdot \tan(\omega)}{Bf} \leq 2.7$$

wherein d2 is distance from the image side of the first lens to the object side of the second lens on the optical axis, d4 is distance from the image side of the second lens to the object side of the third lens on the optical axis, d6 is distance from the image side of the third lens to the object side of the fourth lens on the optical axis, Bf is back focal length of the imaging lens system, fs is effective focal length of the imaging lens system, TL is distance from the object side of the first lens to an image plane on the optical axis, ω is half of maximum field angle (degree), and Y is half of maximum diagonal of imaging height.

2. The device as claimed in claim 1, wherein at least one of optical surfaces on the object side or the image side of the first lens is an aspherical surface.

3. The device as claimed in claim 2, wherein overall length of the imaging lens system satisfies the equation:

$$1.0 \leq \frac{TL}{f_s} \leq 1.5$$

wherein TL is distance from the object side of the first lens to an image plane on the optical axis and $f_s$ is effective focal length of the imaging lens system.

4. The device as claimed in claim 1, wherein both optical surfaces on the object side and on the image side of the first lens are aspherical surfaces.

5. The device as claimed in claim 1, wherein the optical surface on the object side of the meniscus fourth lens is an aspherical surface without inflection point while the optical surface on the image side is an aspherical surface.

6. The device as claimed in claim 5, wherein overall length of the imaging lens system satisfies the equation:

$$1.0 \leq \frac{TL}{f_s} \leq 1.5$$

wherein TL is distance from the object side of the first lens to an image plane on the optical axis and $f_s$ is effective focal length of the imaging lens system.

7. The device as claimed in claim 5, wherein the fourth lens satisfies the equation:

$$1.0 \leq \frac{R31 + R32}{R31 - R32} \leq 4.0$$

wherein R31 is radius of curvature of the object side of the fourth lens, and R32 is radius of curvature of the image side of the third lens.

8. The device as claimed in claim 1, wherein the optical surface on the object side of the meniscus fourth lens is a spherical surface.

9. The device as claimed in claim 8, wherein the fourth lens satisfies the equation:

$$1.0 \leq \frac{R31 + R32}{R31 - R32} \leq 4.0$$

wherein R31 is radius of curvature of the object side of the fourth lens, and R32 is radius of curvature of the image side of the third lens.

10. The device as claimed in claim 1, wherein the fourth lens includes at least one inflection point in the effective diameter range from the lens center to the lens edge on the image side of the fourth lens and the inflection point satisfied the equation:

$$40\% \leq \frac{H_-}{H_t} \leq 70\%$$

wherein $H_-$ is perpendicular distance from the inflection point on the image side of the fourth lens to the optical axis, and $H_t$ is perpendicular distance from the maximum optical effective point on the image side of the fourth lens to the optical axis.

11. The device as claimed in claim 1, wherein the first lens is made from glass while the second lens, the third lens and the fourth lens are made from plastic.

12. The device as claimed in claim 1, wherein the first lens, the second, lens, the third lens and the fourth lens are all made from plastic.

13. The device as claimed in claim 1, wherein the first lens, the second lens, the third lens and the fourth lens are all made from glass.

* * * * *